United States Patent Office 3,179,672
Patented Apr. 20, 1965

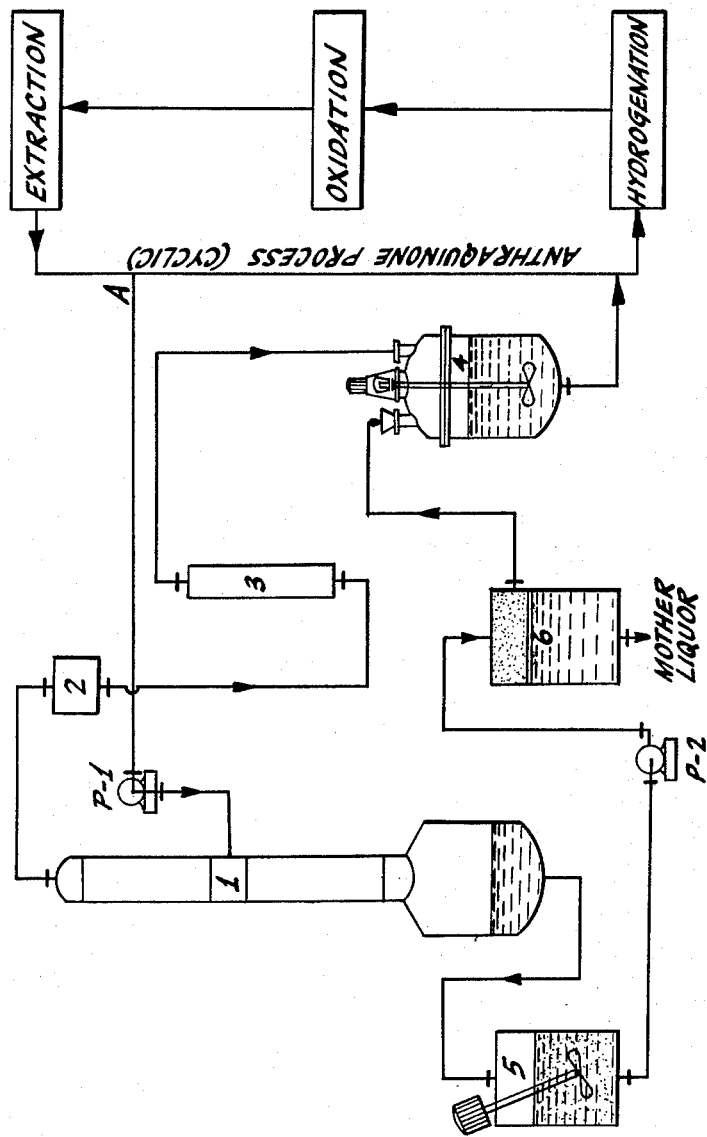

3,179,672
RECONDITIONING OF DEGRADED HYDROGEN PEROXIDE-PRODUCING WORK SOLUTIONS
Hans Herzog and Gerhard Käbisch, Rheinfelden, Baden, Germany, assignors, by mesne assignments, to FMC Corporation, New York, N.Y., a corporation of Delaware
Filed Oct. 3, 1961, Ser. No. 143,029
Claims priority, application Germany, Oct. 7, 1960, D 34,444
5 Claims. (Cl. 260—369)

This invention relates to the reconditioning of partially degraded work solutions taken from the anthraquinone process for the production of hydrogen peroxide.

In the anthraquinone process of producing hydrogen peroxide, hereinafter called the anthraquinone process, an alkylated anthraquinone working compound carried in one or more working solvents for the anthraquinone and its corresponding anthrahydroquinone, is subjected to cyclic oxidation and reduction. The hydrogenation converts the anthraquinone to its hydroquinone form, while the oxidation converts this anthrahydroquinone back to its quinone form, and liberates hydrogen peroxide.

This hydrogen peroxide is extracted from the organic solution with water, and the anthraquinone and working solvent are recycled.

It is a principal requirement for the anthraquinone and solvent components of the working solution that they be stable. However, despite careful selection of these components, it has not been found possible to avoid formation of decomposition products from both the working compound and the solvent, as a result of the constant, successive hydrogenations and oxidations which take place over long periods of time. The decomposition products which are formed must be removed from the working solution, for the reason that if they are permitted to accumulate, with time they reach an amount in the work solution at which they interfere with the reaction.

Several techniques have been developed for overcoming these problems; these can be divided into two principal groups. The first involves processes which retard formation of decomposition products, and includes the following: (a) employment of mild reaction condition in the hydrogenation, oxidation and hydrogen peroxide extraction stages; (b) selection of hydrogenation catalysts which are selective to the desired reaction; (c) selection of working compounds having a high degree of chemical stability; and, (d) selection of solvents having a high degree of chemical stability.

These techniques reduce the quantity of decomposition of products formed in a given period of operation, but they cannot completely prevent their formation.

Accordingly, a second group of techniques has been developed, which effect removal and/or regeneration of such decomposition products as are formed. This group includes the following: (a) absorption of decomposition products, for example on aluminum oxide, and removal of them; (b) regeneration of decomposition products with catalysts such as aluminum oxide; and, (c) dehydrogenation of decomposition products which are susceptible to this treatment, with suitable catalysts.

One process for regenerating extensively decomposed working solutions is taught in German patent publication DAS 1,081,432. The process, in common with other processes of this type, employs several stages requiring complex apparatus. United States Patent 2,909,532 describes a purification process similar to that of DAS 1,081,432, in which the basic principle is to convert the impurities into the desired anthraquinone derivative.

Despite the availability of processes such as those described above, it has remained desirable to provide a process which will permit reconditioning of work solutions by a simple technique, which recovers the bulk of the working solvent and the working compound.

It has now been found, quite unexpectedly, that partially decomposed anthraquinone process work solutions can be reconditioned simply, and with a high efficiency, by distilling off and recovering the working solvent and selectively dissolving decomposition products from the distillation residue with a lower aliphatic alcohol. The undesired decomposition products are soluble in the alcohol whereas the desired anthraquinone possesses essentially no solubility in it and accordingly, the decomposition products are preferentially dissolved, and the anthraquinone can be recovered in a highly pure state and with extreme efficiency. The distillate and recovered anthraquinone are then recombined and employed again in the anthraquinone process.

Methyl, ethyl and isopropyl alcohols are especially suitable as selective solvents for the byproducts in the distillation residue. Their great selectivity for byproducts is surprising; the selective solvents normally employed in anthraquinone chemistry for purification of the anthraquinones, such as O-dichlorobenzene, cresol, nitrobenzene, cresylic acid and chlorinated hydrocarbons, do not operate efficiently in the separation problem encountered in the present process.

It is not possible to precisely define the chemical constitutions of the decomposition formed in the anthraquinone process; however, the quantity of these compounds present in the solution can be determined precisely. The solvent is distilled from the work solution and the quinone content in the distillation residue determined. The quantity of decomposition product, which will be designated hereinafter as tar, can then be calculated by difference.

The anthraquinone encompassed in the present process are those possessing the ability to form hydrogen peroxide in the anthraquinone process cycle. These are normally the mono- or poly-alkylated anthraquinones, although the group may include also esterified anthraquinones and other derivatives. In freshly prepared work solutions, the distillation residue obtained in accordance with the present process consists almost 100% of anthraquinone; the tar content is essentially zero. The tar is formed over a period of time, chiefly by decomposition of the anthraquinone working compound, although some tar is derived from decomposition of the working solvent system.

Normally, a large part of the decomposition products can be distilled with working solvent from the work solution. Such products have been found not to disturb the anthraquinone process reaction, provided they are not acidic. When acid products are found in the distillate, however, it is desirable to neutralize them by contacting the distilate with an alkali, for example sodium hydroxide, sodium carbonate, and the like, for example by running the distillate through an alkali washer before its reuse as a component of the work solution.

Reconditioning of the distillation residue by the present process normally is effected by drawing the residue off, preferably while hot, from the still pot and adding it to the alcohol, suitably in a volume ratio of about 1 to 1. When the batch has cooled the anthraquinone is separated, dissolved in the distillate, and again introduced into the cyclic process for producing hydrogen peroxide.

The recovery of the solvent by the present process is almost quantitative; the anthraquinone present in the work solution can be recovered in about 90 to 93% yield. An increase in the anthraquinone yield can be obtained by various additional steps, which will be described here.

A particularly effective additional step involves treating the distillation residue, before precipitation of the anthraquinone, with active aluminum oxide at an elevated temperature, suitably for several hours. This operation preferably is carried out with stirring, and with passage of oxygen through the solution. Simply heating the distillation residue before anthraquinone recovery also improves its recovery yield.

Another useful treatment involves treating the distillation residue by extraction with hot aqueous solutions of alkali prior to addition of the residue to the alcohol. It is also helpful to subject the distillation residue to a brief, further, distillation prior to isolation of the anthraquinone.

Another treatment involves adding the distillation residue while hot to the alcohol, separating the anthraquinone, freeing the mother liquor from the alcohol, and treating the mother liquor residue obtained by these means by contact with active aluminum oxide. This is best carried out with stirring at elevated temperatures and with passage of oxygen through the solution.

A further method for improving the yield of anthraquinone involves treating the anthraquinone which has been separated from the decomposition products, together with the distillate, with active aluminum oxide.

These additional steps may be employed alone or they may be combined in any desired way. Whether an additional operation is desirable, or which operation or combination of operations is selected, is determined on the basis of the nature of the work solution, the quantity of decomposition product, and economics.

Essentially any of the solvents for anthraquinone process working solutions known heretofore may be purified by the present process. The only limitation is that the solvent should have a sufficiently lower boiling point than the anthraquinone derivative, so that it may be separated from the anthraquinone derivative by distillation.

The present reconditioning process can be carried out batchwise or continuously. The particularly advantageous embodiment which operates essentially continuously will be described with reference to the attached drawing which is a flow sheet of the process.

The cyclic anthraquinone process for producing hydrogen peroxide is represented in the block diagram at the right of the drawing, with the work solution being shown as flowing from the hydrogenation stage to the oxidation stage, then to the extraction stage, and thereafter back to the hydrogenation stage. When the amount of decomposition products in the work solution has reached a point where purification is desirable, a portion of the work solution flow is drawn off at a point A and sent continuously into the reconditioning apparatus. This is a suitable point for withdrawal of the used working solution, as it follows removal of the hydrogen peroxide from the solution, and precedes the hydrogenation stage.

The working solution is passed continuously through pump P-1 into a continuously operating vacuum distillation apparatus 1, to provide a distillation residue and a distillate; the latter is cooled in cooler 2, passed into washer 3 where it is treated with alkali to remove any acid substances present in it, and from there passed to vessel 4 equipped with a stirrer. In vessel 4 it is mixed with treated residue from the distillation, prior to return to the anthraquinone process cycle. The distillation residue flows continuously from the bottom of distillation apparatus 1 into selective dissolution vessel 5, which is filled with alcohol. In vessel 5, the decomposition products from the process present in the distillation residue are selectively dissolved, leaving the insoluble, pure anthraquinone. This insoluble anthraquinone, dispersed in mother liquor, is passed through pump P-2 into a suction filter 6, where it is separated from the mother liquor; from this point it is passed into stirring vessel 4, where it is mixed with the purified solvent and the resulting pure working solution is returned to the anthraquinone process cycle. As required, the alcohol solution in selective dissolution vessel 5 is replaced or purified for removal of impurities.

The following examples are given by way of illustration only, and are not to be considered limiting on the scope of the present process or materials.

*Example 1*

One liter of work solution, originally prepared by dissolving 100 g of 2-ethyl anthraquinone in a solvent mixture consisting of 60 parts by volume of octanol and 40 parts per volume of methyl naphthalene, after two years of continuous operation during which time the octanol and 2-ethyl anthraquinone were repeatedly replenished as required, had the following composition:

| Material: | Amount grams per liter |
|---|---|
| 2-ethyl anthraquinone | 73 |
| Tar content | 65 |
| Quantity of substances capable of extraction by 20% sodium hydroxide | 27 |

One liter of this decomposed work solution was distilled up to 150° C. under a vacuum of 12 mm. of mercury. This yielded 864 cc. of distillate and 151 g. of distillation residue. When the distillate was extracted with aqueous 20% sodium hydroxide solution, 14 g. of acid reacting materials was removed. The distillation residue was poured hot into 200 mm. of ethyl alcohol. After the resulting mixture had cooled, 65 g. of ethyl anthraquinone having a melting point of 108 to 110° C. was present as a solid. This anthraquinone was then dissolved in the distillate, and the solution prepared was mixed with fresh 2-ethyl anthraquinone for the preparation of fresh work solution.

*Example 2*

A partially decomposed work solution having the composition shown in Example 1 was distilled as in Example 1, with the difference that the distillation residue was treated with stirring with 25 g. of active alumina for 5 hours at 120° C. prior to treatment with alcohol and separation of the 2-ethyl anthraquinone. Oxygen gas was passed through the mixture during this treatment. After this treatment, the batch was diluted hot with 200 mm. of isopropanol. The resulting mixture was cooled, and 67 g. of 2-ethyl anthraquinone was recovered as a solid. This material had a melting point of 107 to 108° C.

*Example 3*

A sample of the decomposed work solution of Example 1 was distilled as in Example 1 and the distillation residue was poured hot into 200 mm. of methanol. The resulting mixture was cooled and 64 g. of 2-ethyl anthraquinone having a melting point of 106 to 109° C. was separated as a solid. The mother liquor resulting from this crystallization was distilled to free it from methanol, and treated with active alumina for 5 hours at 120° C., while oxygen gas was passed through it. The treatment was effected with stirring. Ten grams more of relatively pure 2-ethyl anthraquinone, having a melting point of 95 to 97° C. was obtained by this treatment.

What is claimed is:

1. Process for reconditioning a partially decomposed anthraquinone process work solution containing a monoalkylated anthraquinone capable of being cyclically reduced and oxidized to produce hydrogen peroxide, solvents having a boiling point which is lower than said anthraquinone, and decomposition products of these materials, comprising distilling working solvent from the said work solution and recovering said solvent, treating the residue from said distillation, containing the anthraquinone and decomposition products, with at least about an equal volume of an alkanol having 1 to 3 carbon atoms to selectively dissolve decomposition products and leave the anthraquinone, and recovering the portion of the residue not dissolved in the alkanol and which contains the reconditioned anthraquinone.

2. Process of claim 1 in which prior to its treatment with the alkanol the distillation residue is treated with active alumina and oxygen.

3. Process of claim 1 in which the anthraquinone is separated from the alkanol-treated distillation residue, the mother liquor remaining after the removal of the anthraquinone is separated from the alkanol, the alkanol-free mother liquor is treated with active alumina to form additional anthraquinone, and this anthraquinone is recovered.

4. Process of claim 1 in which the distillate is treated with an aqueous alkaline solution in amounts sufficient to neutralize the acidic decomposition products.

5. Process of claim 1 in which the anthraquinone working compound is 2-ethyl anthraquinone.

References Cited by the Examiner
UNITED STATES PATENTS

| | | | |
|---|---|---|---|
| 2,842,563 | 7/58 | Hinegardner et al. | 260—369 |
| 2,901,490 | 8/59 | Sprauer | 260—369 |
| 2,901,491 | 8/59 | Eller et al. | 260—369 |
| 2,909,532 | 10/59 | Cosby et al. | 260—369 |
| 2,940,987 | 6/60 | Eller et al. | 260—369 |

LORRAINE A. WEINBERGER, *Acting Primary Examiner.*

CHARLES B. PARKER, LEON ZITVER, *Examiners.*